Jan. 18, 1927.
A. G. MEYER ET AL
1,615,129
DIRIGIBLE HEADLIGHT
Filed March 31, 1926    4 Sheets-Sheet 1
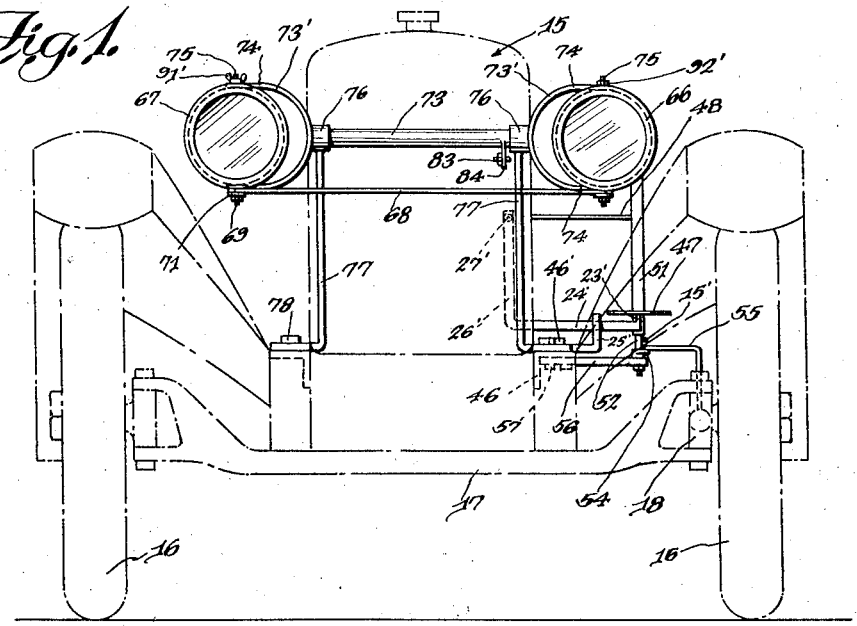
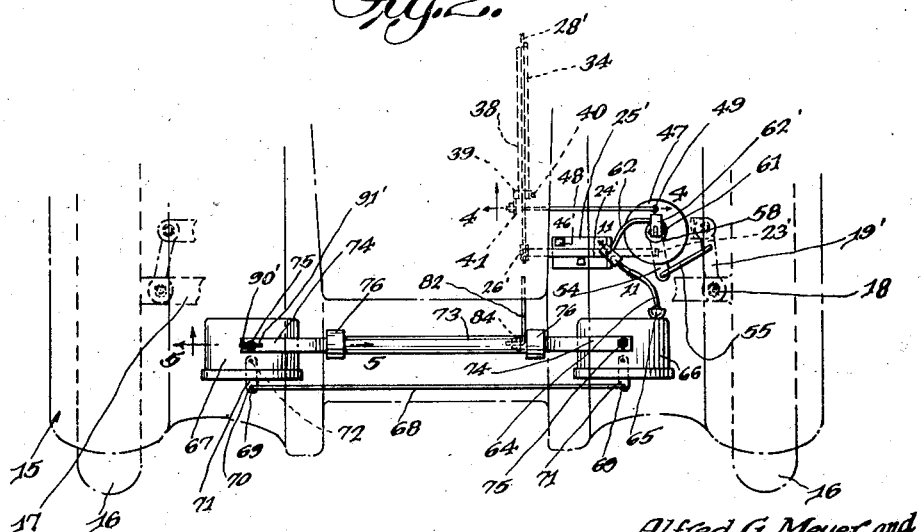
Alfred G. Meyer and
William Meyer
INVENTORS
BY Victor J. Evans
ATTORNEY

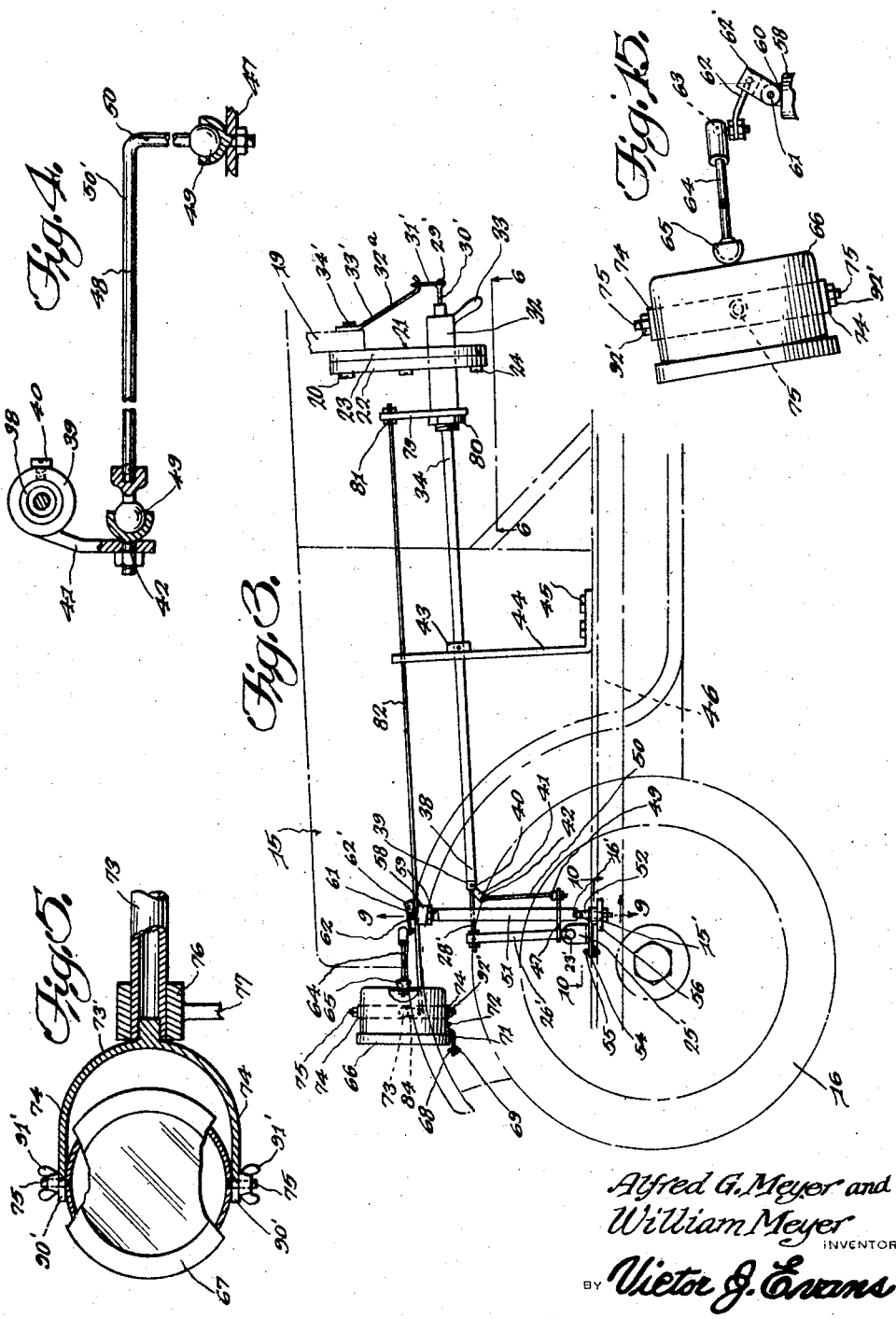

Jan. 18, 1927. 1,615,129
A. G. MEYER ET AL
DIRIGIBLE HEADLIGHT
Filed March 31, 1926  4 Sheets-Sheet 3
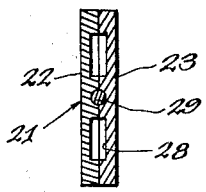
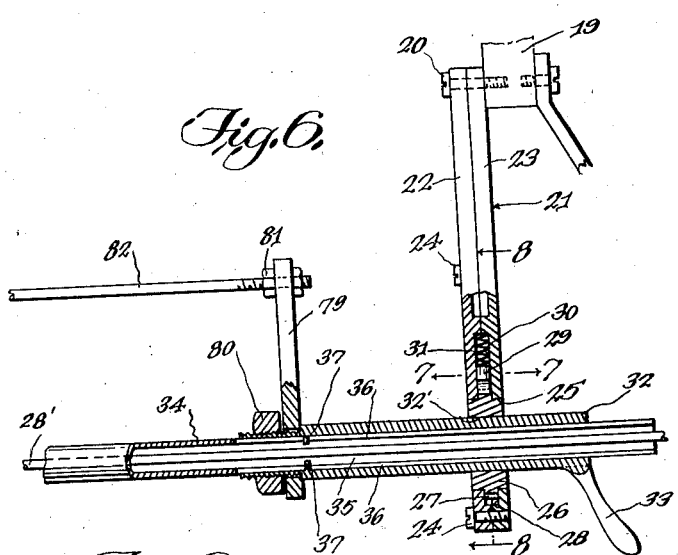
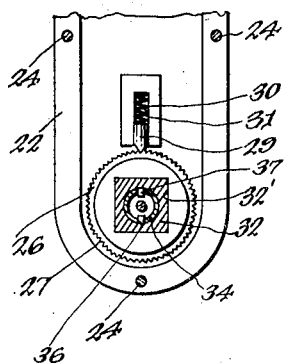
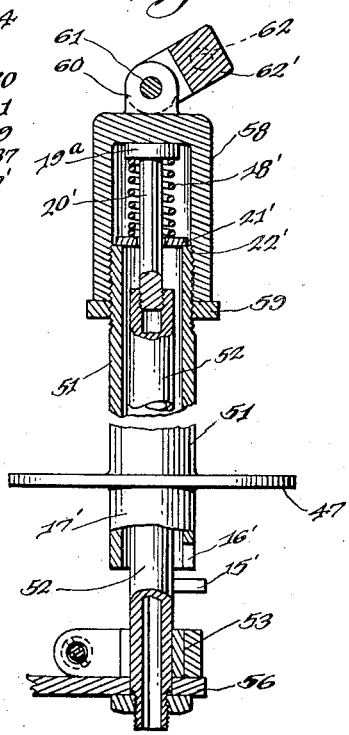
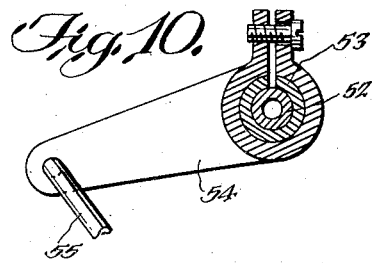
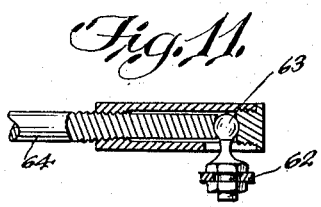
Alfred G. Meyer and
William Meyer
INVENTORS
BY Victor J. Evans
ATTORNEY Jan. 18, 1927.

A. G. MEYER ET AL 1,615,129

DIRIGIBLE HEADLIGHT

Filed March 31, 1926     4 Sheets-Sheet 4

Alfred G. Meyer and
William Meyer
INVENTORS

BY Victor J. Evans
ATTORNEY

Patented Jan. 18, 1927.

1,615,129

UNITED STATES PATENT OFFICE.

ALFRED G. MEYER AND WILLIAM MEYER, OF CHICAGO, ILLINOIS.

DIRIGIBLE HEADLIGHT.

Application filed March 31, 1926. Serial No. 98,767.

This invention relates to certain novel improvements in dirigible headlights and more particularly to mechanism for turning headlights from the right or left and for tilting the same from a horizontal position and has for its principal object the provision of an improved construction of this character which will be highly efficient in use and economical in manufacture.
Among the several objects of the invention is the production of a device of this character wherein the mechanism for operating the headlights can be manually manipulated or be manipulated by action of the steering mechanism of the vehicle and wherein there is provided a simple combination and arrangement of parts for connecting and disconnecting the mechanism from operation with the steering mechanism.
A further object of the invention is to provide mechanism for tilting the headlights of a vehicle or for turning them from right to left or vice versa and wherein the mechanism can be applied to a vehicle either during the course of manufacture or at any time thereafter without materially altering the construction of the same.

Other objects will appear hereinafter.

The invention will be best understood by reference to the accompanying drawings illustrating the preferred form of construction, and in which—

Fig. 1 is a front elevational view of a vehicle illustrating the invention associated therewith, Fig. 2 is a fragmentary top plan view of the same, Fig. 3 is a fragmentary side elevational view of the same, Fig. 4 is a fragmentary sectional detail view of the invention taken substantially on line 4—4 of Fig. 2, Fig. 5 is a fragmentary sectional detail view of the same taken substantially on line 5—5 of Fig. 2, Fig. 6 is a fragmentary sectional detail view taken substantially on line 6—6 of Fig. 3 looking thereupon from a side of the vehicle, Fig. 7 is a fragmentary sectional detail view of the same taken substantially on line 7—7 of Fig. 6.

Figure 12:
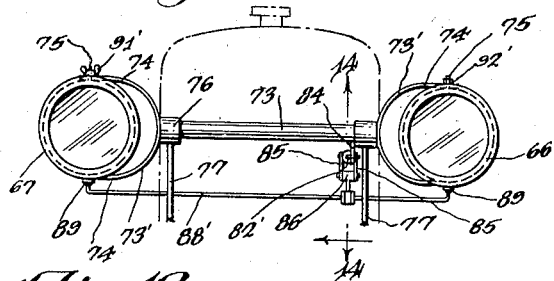
Figure 13:
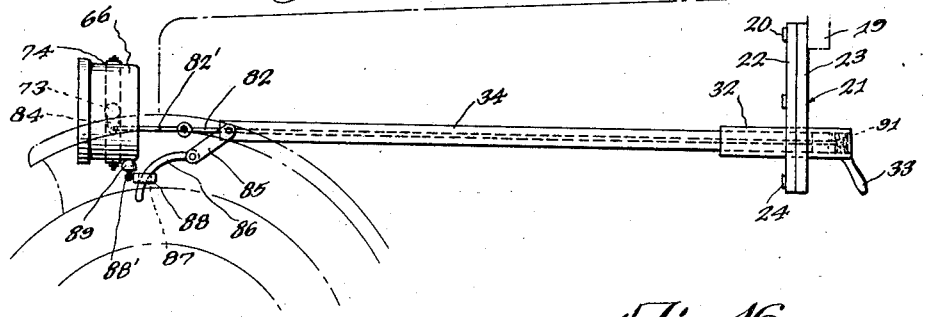
Figure 16:
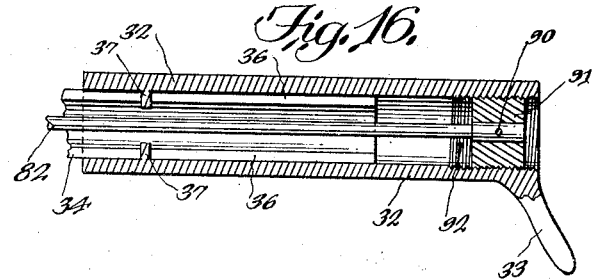
Figure 14:
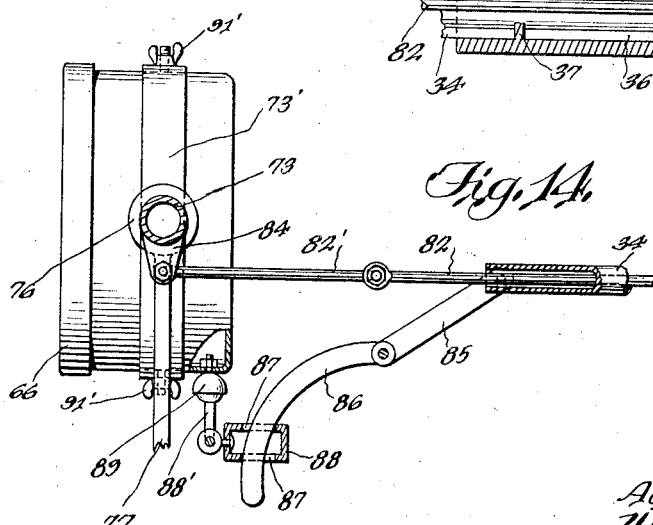

Fig. 8 is a fragmentary sectional detail view of the same taken substantially on line 8—8 of Fig. 6, Fig. 9 is a fragmentary sectional detail view of the same taken substantially on line 9—9 of Fig. 3, Fig. 10 is a fragmentary sectional detail view taken substantially on line 10—10 of Fig. 3, Fig. 11 is a fragmentary sectional detail view taken substantially on line 11—11 of Fig. 2, Fig. 12 is a fragmentary front elevational view of a vehicle illustrating the invention associated therewith showing a modified form of construction, Fig. 13 is a fragmentary side elevational view of a vehicle illustrating the modified form of construction associated therewith, Fig. 14 is a fragmentary sectional detail view of the same taken substantially on line 14—14 of Fig. 12, Fig. 15 is a fragmentary side elevational view of one of the headlights illustrated in Fig. 3, showing the same in tilted position, and Fig. 16 is a fragmentary sectional detail view of an operating arm illustrated in Fig. 13.

Referring to the drawings, especially to Figs. 1 to 11 inclusive illustrating the preferred form of construction, a vehicle is illustrated in dotted lines and indicated at 15. This vehicle includes the usual front wheels 16, axle 17, steering spindle 18, and the spindle connecting link 19'. To this vehicle is applied our invention.

In describing the preferred form of construction we will, for convenience, describe in detail, first the mechanism for turning the headlights from right to left and vice versa, following thereafter with a detailed description of the mechanism for tilting the headlights.

The vehicle 15 includes the ordinary dash board 19 to which is secured at 20 a bracket 21. This bracket 21 includes separable parts 22 and 23 Fig. 6, secured together as at 24. The separable parts of this bracket define an opening 25 for the accommodation of a ratchet-wheel 26. This ratchet-wheel includes teeth 27 which work in an annular groove 28 formed in the separable parts of the bracket 21. A stop pawl 29 is associated for operation with the ratchet-wheel 26 and this stop pawl is confined in a recess 30 defined by the separable parts of the bracket and is normally held in operative engagement with the ratchet-wheel 26 through the medium of a spring member 31 confined in the recess 30. This ratchet-wheel has a square opening 32' formed centrally therein through which an operating arm 32 passes, the operating arm being substantially square shape in cross-section. This operating arm is hollow in form and has formed as an integral part thereof an operating handle 33.

Extending through this arm is a sleeve 34 open at opposite ends. The inner end portion 35 of the sleeve has opposite diametrical longitudinally extending slots 36 formed therein for the accommodation of guide pins 37 formed as an integral part of the operating arm 32. The arrangement is such that by grasping the handle 33 the operating arm can be rotated to urge rotation to the ratchet-wheel for reasons hereinafter understood and can be moved in a direction along its length for reasons hereinafter understood.

The opposite end portion 38 of this sleeve carries a collar 39 which is fixed thereto by a set screw 40. This collar has formed therein as an integral part thereof a lug 41 having a hole 42 in its outer end portion.

To resist forward movement of the sleeve 34 when the operating arm 32 is moved in the direction above mentioned a collar 43 is carried by the sleeve for abutment with a bracket 44.

This bracket 44 is secured as at 45 to the chassis 46 of the vehicle 15. This bracket serves in its principal capacity as a support for the sleeve 34.

The lug 41 is operatively connected to a flange 47 through the medium of a link member 48, the link member 48 being connected to the lug and flange through the medium of ball and socket connections 49 and has a portion 50 thereof bent substantially at right angles with respect to the remaining portion 50' of this link member, as best illustrated in Fig. 4.

The flange 47 is formed as an integral part of and extending laterally in substantially a horizontal plane from a sleeve 51 carried for rotation and longitudinal movement by a post 52 operatively connected as at 53 to an integral lateral arm 54 in turn connected to the spindle connecting link 19' through the medium of a link 55. This post 52 is rotatably carried by a bracket 56 connected as at 57, Fig. 1, to the chassis 46 of the vehicle 15.

The upper end of the sleeve 51 includes a cap 58 threaded upon the sleeve at said upper end and located for movement therewith by a lock nut 59. This cap 58 defines an ear 60 to which is pivotally connected as at 61 a pivot block 62' connected to which and extending laterally therefrom is a link member 62 curved in an inward and forward direction from the block 62' as best illustrated in Fig. 2.

This link member is operatively connected by means of a ball and socket connection 63 to an operating rod 64 which in turn is operatively connected through the medium of a ball and socket connection 65 to the headlight 66 of the vehicle, said connection thereto being to the right of the vertical axis of this headlight for reasons hereinafter understood.

It is important to note that this operating rod 64 leads from the headlight 66 in an inward and rearward direction so as to dispose the pivotal connection between itself and the link member 62 at a point to the left of the longitudinal axis of the sleeve 52 for reasons hereinafter set forth. The headlight 66 is operatively connected for unitary movement to the headlight 67 of the vehicle through the medium of a connecting rod 68 having angled nut receiving ends 69 projecting through openings 70 formed in extensions 71 carried as at 72 by the headlights 66 and 67.

These headlights are supported for turning and tilting movement through the medium of a rotatable shaft 73 having opposite bifurcated ends 73' providing supporting arms 74 receiving the trunnions 75 of the lamps.

This operating shaft 73 is supported by bearings 76 formed as an integral part of brackets 77 secured to the chassis 46 of the vehicle 15 as at 78.

As herein mentioned the sleeve 51 is carried for longitudinal movement by the post 52 and is adapted to have operative connection to this post through the medium of a pin member 15' adapted for engagement in a slot 16' formed in the lower end portion 17' of the sleeve 51 below the flange 47. The sleeve 51 is normally held in a position to engage the pin 15' in the slot 16' through the medium of a spring member 18' disposed between a head 19ª of a stud screw 20' and a washer 21' resting upon the adjacent edges 22' of the sleeve 21, the stud screw 20' having threaded engagement with the post 52, as best illustrated in Fig. 9.

This sleeve is held in a position to dispose the pin 15' from engagement in the slot 16' through the medium of a lift dog 23', Figs. 1 and 3. This lift dog 23' is formed as an integral part of a rod 24' which is mounted for rocking movement upon a bracket 25' secured to the chassis 46 of the vehicle as at 46'. This rod 24' has an angled end 26' which is operatively connected as at 27', Fig. 3, to an operating link 28'. This operating link 28' extends through the sleeve 34 and has a loop 29' formed in its outer end portion 30'. To this loop 29' is rigidly secured a ring member 31' adapted for hooked engagement with the hook shaped end portion 32ª of a hook 33' secured to the dash board 19' as at 34', Fig. 3.

This completes the description of the mechanism for turning the headlights from right to left and vice versa. The operation of this mechanism will now be described in such language as will be best understood by those skilled in the art.

In manipulating the mechanism manually it is manifest that the pin 15' must be free from engagement with the sleeve 51 and held free from such engagement during manipulation manually of the mechanism. This is accomplished by grasping the ring 31' so as to move the operating link 28' in a forward direction through the sleeve 34. This moving of the operating link 28' rocks the rod 24' in the direction of the movement of the link 28' upon the bracket 25'. This rocking of the rod 24' rotates the lift dog 23' in a direction to engage the flange 47 to effect upward movement of the sleeve 51 to raise this sleeve to bring the slot from disengagement with the pin 15'. The sleeve in this position permits the mechanism to be manually operated. This operation is accomplished by grasping the handle 33 to rotate the operating arm 32 in a direction to effect rotation of the sleeve 51 about the post 52 through the medium of the sleeve 34, lug 41, link 48 and flange 47. As this sleeve 51 is rotated the headlights 66 and 67 are caused to turn opposite the direction of rotation by reason of the connection thereof with the sleeve 51 through the medium of the links 62 and 64.

When it is desired to manipulate the mechanism through the medium of the steering mechanism of the vehicle the ring 31' is firmly grasped to draw the link 28' through the sleeve 34 in a direction to rock the rod 24' upon the bracket 25' in an opposite direction than that above stated, to move the lifting dog 23' from supporting position with respect to the flange 47 to permit the sleeve 51 to drop downwardly longitudinal of the post 52 to bring the pin 15' into engagement in the slot 16'. Under these conditions it is manifest that the sleeve 51 will rotate with the post 52 and as the post is operatively connected to the connecting link 19' of the steering mechanism of the vehicle it is obvious that when this connecting link is operated to turn the front wheels of the vehicle that turning action will be imparted to the headlights in the same direction as the turning of the wheels by reason of the connection between the headlight 66 and sleeve 51 through the medium of the links 62 and 64.

In Fig. 2, for the purpose of avoiding confusion as to the operation of the mechanism when manipulated through the medium of the steering mechanism we have indicated generally the direction of the movement of the various connecting links by arrows and upon inspection of this figure it will be seen that the link member 62 is rotated in the same direction as the link member 64 and that by reason of the curvature of the link member 64 the link member 62 will act upon this latter link member and turn the lamps 66 in the same direction as the turning of the wheels.

We will now proceed to describe in detail the mechanism for tilting the headlights. This mechanism includes a connecting arm 79 loosely supported by the operating arm 32 and held against longitudinal movement therein through the medium of a nut 80. By loosely mounting this arm upon the sleeve 32 it is manifest that when the arm 32 is rotated, rotation will not be imported to this connecting arm. This connecting arm is operatively connected as at 81 to an operating link 82 which in turn is operatively connected as at 83 to the operating shaft 73 through the medium of a lateral lug 84.

To tilt the headlights the handle 33 is firmly grasped so as to move the operating arm 32 in a direction along the length of the sleeve 34 with the pins 37 working in the slots 36. As this operating arm 32 is moved in said direction movement of the link 82 likewise takes place in the same direction and the shaft 73 is caused to rotate tilting the headlights in the direction of rotation of the shaft.

It is to be noted that when the headlights are tilted the link 64 acts upon the link 62 to move the block 62' upwardly about its pivot 61 to permit the headlights to be tilted a sufficient distance as permitted by operation of this operating arm 32. This upward movement of the block 62' permits forward movement of the links 62 and 64 which forward movement is necessary to permit the tilting of the headlights.

The ratchet-wheel 26 and the lock dog 29 serves to retain the operating arm 32 in the desired rotated position when the turning mechanism is manually manipulated.

In Figs. 12 to 14 inclusive we have illustrated a slightly modified form of construction in which the operating link 82 is pivotally connected at one end to a connecting link 82' which in turn is pivotally connected to a lug 84 carried by the operating shaft 73. In this construction the sleeve 34 pivotally carries a connecting link 85 which in turn is pivotally connected to a curved operating link 86 adapted to work through slots 87 formed in a block 88 connected to the headlights 66 through the medium of a connecting link 88' and a ball and socket connection 89. The opposite end of the link 82 is fixed as at 90 to a nut 91 which nut is threaded in one end of the arm 32, therein being sufficient threads 92 formed in the arm 32 to permit the arm to rotate without urging rotation to the nut which nut is held against rotation by the link 82.

The operation of this device is such that by drawing the link 82, which in the present instance is a rigid link, through the sleeve 34, by means of the operating arm 32 the headlights will be caused to tilt in the direction of which the link is drawn. By forcing the link 82 through the sleeve 34 the headlights are likewise caused to tilt in the direction of movement of this link. To turn the headlights from right to left and vice versa the operating sleeve 32, in this construction, is rotated to urge rotation to the ratchet-wheel 26 for the purpose herein mentioned. Upon rotation of the operating sleeve 34 the curved operating link 86 acts upon the block 88 to turn the headlights from the right or left as the case may be.

It is pointed out that by mounting the nut 91 in the arm 32 that when the arm is rotated the nut being held against rotation by the rigid link 82 permits the arm 32 to be rotated without effecting rotation to this link.

The headlight 67 has its trunnion 75 mounted in slots 90' formed in the arms 74 separating this headlight, and this headlight as well as the headlight 66, is secured to these arms through the medium of nuts 91' and 92', the nuts 91' being what is commonly known as thumb nuts. By partly unthreading the thumb nuts 91' from the trunnion of the headlights 67 the headlight may be expeditiously removed and be used as a trouble light. In removing this headlight it is obvious that the end of the rod 68 connected to the extension 71 carried by this headlight is detached.

From the description herein it is evident that we provide a simple combination and arrangement of parts for expeditiously tilting the headlights of a vehicle as well as turning the headlights from right to left or vice versa as the case may be and that this mechanism can be either manually operated or be connected for operation with the steering mechanism of the vehicle.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described the preferred form of construction of our invention, what we claim as new and useful is:

1. Mechanism for operating dirigible headlights of a vehicle including a rotatable sleeve, operative connection between the sleeve and the headlights, an operating sleeve, operative connection between the operating sleeve and the rotatable sleeve, an operating rod having operative connection with the headlights, an operating arm rotatably and slidably associated with the operating sleeve for operating said operating sleeve upon rotation of said arm, there being an operative connection between the arm and the rod for operating the rod upon movement of the arm in a direction along the length of the operating sleeve.

2. Mechanism for operating dirigible headlights of a vehicle including a rotatable sleeve, operative connection between the sleeve and the headlights, an operating sleeve, operative connection between the operating sleeve and the rotatable sleeve, an operating rod having operative connection with the headlights, an operating arm rotatably and slidably associated with the operating sleeve for operating said operating sleeve upon rotation of said arm, there being operative connection between the arm and the rod for operating the rod upon movement of the arm in a direction along the length of the operating sleeve, and means for optionally operatively connecting the rotatable sleeve with the steering mechanism of the vehicle.

3. Mechanism for operating dirigible headlights of a vehicle including a rotatable sleeve, operative connection between the sleeve and the headlights, an operating sleeve, operative connection between the operating sleeve and the rotatable sleeve, an operating rod having operative connection with the headlights, an operating arm rotatably and slidably associated with the operating sleeve for operating said operating sleeve upon rotation of said arm, there being operative connection between the arm and the rod for operating the rod upon movement of the arm in a direction along the length of the operating sleeve, means for optionally operatively connecting the rotatable sleeve with the steering mechanism of the vehicle, said means including a lift member, means rotatably supporting the lift member, and means for rotating the lift member to move said lift member into engagement with the rotatable sleeve to move said rotatable sleeve from engagement with the means operatively connecting the rotatable sleeve with the steering mechanism of the vehicle.

4. Mechanism for operating dirigible headlights including an operating sleeve, an operating arm mounted for movement longitudinally of the operating sleeve and having operative connection therewith to urge rotation of the sleeve upon rotation of the arm, means carried by the dash board of the vehicle for supporting the arm for rotation, an operating member extending through the sleeve and operatively connected to the headlights and to the arm for tilting said headlights upon movement of the arm longitudinally of the sleeve, an operative connection between the sleeve and the headlights adapted to urge turning movement of the headlights upon rotation of the sleeve when acted upon by the arm.

5. Mechanism for operating dirigible headlights including an operating sleeve, an operating arm mounted for movement longitudinally of the sleeve and having operative connection therewith to urge rotation of the sleeve upon rotation of the arm, means carried by the dash board of the vehicle for supporting the arm for rotation, an operating member extending through the sleeve and operatively connected to the headlights and to the arm for tilting said headlights upon movement of the arm longitudinally of the sleeve, operative connection between the sleeve and the headlights adapted to urge turning movement of the headlights upon rotation of the sleeve when acted upon by the arm.

6. Mechanism for operating dirigible headlights including an operating sleeve, an operating arm mounted for movement longitudinally of the sleeve and having operative connection therewith to urge rotation of the sleeve upon manual rotation of the operating arm, means carried by the dash board of the vehicle for supporting the arm for rotation, an operating member extending through the sleeve and operatively connected to the headlights and to the arm for tilting said headlights upon movement of the arm longitudinally of the sleeve, operative connection between the sleeve and headlights adapted to urge turning movement of the headlights upon rotation of the sleeve when acted upon by the arm, means for releasably holding the arm against rotation, said means including a ratchet wheel carried by the arm, and a stop pawl carried by the supporting means for releasable engagement with the ratchet wheel.

In testimony whereof we affix our signatures.

ALFRED GEO. MEYER.
WILLIAM MEYER.